June 27, 1967  A. B. GANCY  3,328,130
DISSOLUTION OF TRONA AT ELEVATED TEMPERATURE AND PRESSURE
Filed June 25, 1964  2 Sheets-Sheet 1

INVENTOR.
ALAN B. GANCY

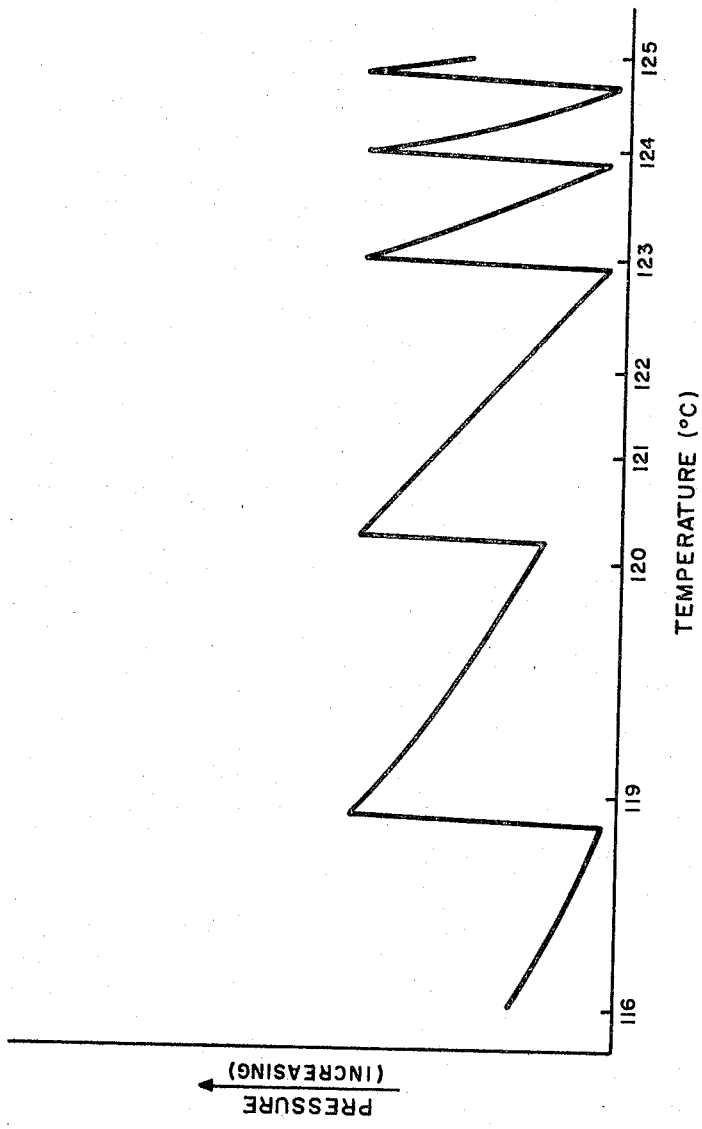

3,328,130
DISSOLUTION OF TRONA AT ELEVATED TEMPERATURE AND PRESSURE
Alan B. Gancy, Princeton, N.J., assignor to FMC Corporation, New York, N.Y., a corporation of Delaware
Filed June 25, 1964, Ser. No. 378,020
3 Claims. (Cl. 23—312)

The present invention relates to a method of liquefying sodium sesquicarbonate, either in its naturally occurring form as trona or in its synthetic form as discreet sodium sesquicarbonate crystals.

Natural sodium sesquicarbonate $$(Na_2CO_3 \cdot NaHCO_3 \cdot 2H_2O)$$

is obtained by mining trona deposits in Sweet Water and adjacent counties in Wyoming. The mined trona is processed by progressive grinding thereof in a series of crushing operations until it consists of particles no larger than $-\frac{1}{4}$-inch mesh. Thereafter, the ground trona is dissolved in a hot aqueous solvent; this is preferably a mixture of water and mother liquor which has been recovered from a previous sesquicarbonate crystallization step described hereinafter. The hot (about 95° C.) aqueous solvent solution containing the dissolved trona is filtered and purified with activated charcoal to remove natural impurities in the trona. This solution is then cooled and concentrated, preferably in multiple effect vacuum crystallizers, to precipitate sodium sesquicarbonate crystals. The resultant crystals are separated from the supernatant mother liquor; this latter, with added makeup water, is returned to dissolve more crude trona in a cyclic type system. This process is described in detail in U.S. Patents 2,346,140 and 2,639,217.

One drawback of this process is the difficulty of dissolving trona in the hot aqueous solvent. For example, the congruent solubility of trona in a typical recycle solvent (12% by weight sodium carbonate solution) is about 8% by weight at 95° C., and this is reached only after prolonged contact of the trona with the hot aqueous solvent. One method for decreasing the dissolving time is to crush the trona to a very fine size to permit better contact between the aqueous solvent and the trona. This fine grinding of the mined trona is expensive, time consuming, and requires large capital outlays for grinding equipment since the large sections of mined trona must be ground in several stages to reach the desired fineness. As a result, there has been a need for some method for making the trona more readily soluble without the necessity of using the fine grinding technique presently employed.

It is an object of the present invention to treat trona in order to obtain more rapid dissolution of trona on contact with a hot aqueous solvent.

This and other objects will be apparent from the following disclosure.

I have now found that when trona (sodium sesquicarbonate) is heated to temperatures of at least about 122° C. under autogenous water vapor pressures of at least about 1200 mm. of Hg, a continuous liquid phase is formed throughout the trona body which is made up of a saturated aqueous solution of sodium carbonate and sodium bicarbonate. This liquid phase goes into immediate solution upon contact with an aqueous solvent.

In addition, I have also found that when liquefaction occurs, the structural strength of trona rapidly deteriorates; this is due to the formation of a liquid phase between the original crystals which weakens the structure, and to a subsequent change in the crystal makeup of the solids in contact with the liquid phase. This change in the trona structure is not a melting phenomenon, but rather a transformation into two entirely new solid phases and an attendant solution phase.

It is most surprising that sodium sesquicarbonate forms a liquid phase upon mere heating of the solid body under autogenous pressures. When heated under normal atmospheric pressures trona decomposes to soda ash without formation of a liquid phase. Normal decomposition occurs in two stages; in the first stage, the trona decomposes to Wegscheider's salt ($3NaHCO_3 \cdot Na_2CO_3$), sodium carbonate and water vapor as illustrated in the following equation:

EQUATION I $$Na_2CO_3 \cdot NaHCO_3 \cdot 2H_2O \rightarrow \tfrac{1}{3}(3NaHCO_3 \cdot Na_2CO_3) + \tfrac{2}{3}Na_2CO_3 + 2H_2O$$

The Wegscheider salt component thus formed decomposes to sodium carbonate and a gas phase of carbon dioxide and water vapor simultaneously with the trona decomposition. Wegscheider's salt decomposition occurs as illustrated in the following equation:

EQUATION II $$\tfrac{1}{3}(3NaHCO_3 \cdot Na_2CO_3) \rightarrow \tfrac{5}{6}Na_2CO_3 + \tfrac{1}{2}CO_2 + \tfrac{1}{2}H_2O$$

In one embodiment of the present process, the sodium sesquicarbonate is placed in a closed container and heated to a temperature above about 122° C. for a time sufficient to permit the autogenous pressure to be generated by decomposition of a portion of the sodium sesquicarbonate. Once the desired temperature and pressure have been reached, a discontinuous liquid phase made up of sodium carbonate, sodium bicarbonate and water appears throughout the entire solid trona body. The aqueous solvent, which is then introduced into the closed container under pressure, immediately takes up the accessible liquefied trona thereby readily penetrating the trona body; the penetrating solvent can more readily dissolve the solids and also penetrate to other liquefied cavities to the limit of its solubility. The pregnant aqueous solvent is then pumped out and processed in the conventional manner for recovery of the sodium carbonate and sodium bicarbonate values.

When liquefaction first occurs, the solid trona that is in direct contact with the liquid phase is unstable at these temperatures and pressures and is converted to an equilibrium mixture of solid Wegscheider's salt and anhydrous sodium carbonate. This conversion of the sodium sesquicarbonate takes place not merely as a surface phenomenon, but rather throughout the trona particle wherever the liquid phase contacts and heats the sodium sesquicarbonate to the required temperature. By finite movement of one or more reaction fronts throughout the entire trona mass, the conversion will continue until no sodium sesquicarbonate remains.

It should be noted that the instant liquefaction takes place either in the absence or presence of an aqueous solvent, provided the critical temperature and necessary water vapor pressure are reached. In either case, liquefaction occurs throughout the trona body. Thus, extraction can take place by first heating the trona under autogenous pressures in the absence of an aqueous solvent, and then introducing the solvent, under pressure, to dissolve immediately the liquefied portion of the trona and to commence attacking the solids; alternately, the trona can be heated in the presence of an aqueous solvent to the required temperatures and water vapor pressures to immediately take up the liquefied portion and to commence dissolving the remaining solids.

The amount and composition of the liquid phase is dependent upon the temperature employed. For example, at a temperature of about 122° C., the liquid phase is very small, constituting only a small fraction of the trona body. At a temperature of about 140° C., dry sodium sesquicarbonate (trona) will be converted to a system containing 48% Wegscheider's salt, 27% sodium carbonate and 25% liquor, in which the liquor is composed of 22% sodium carbonate, 14.6% sodium bicarbonate and 63.4% water. Although the structural strength of trona is materially weakened at about 122° C., where only a small proportion of liquid is present, temperatures materially above 122° C. are required to increase the proportion of liquid phase.

The critical liquefaction temperature of sodium sesquicarbonate, namely about 122° C., does not appear to change materially with increases in pressure, even with the application of external pressures as high as 700 p.s.i. on the sodium sesquicarbonate charge.

The presence of a continuous saturated liquid phase of sodium bicarbonate and sodium carbonate in the solid trona body reduces the structural strength of the trona. This is most valuable in applications such as underground mining where liquefaction within the trona bed, behind the trona-extracting liquor interface, would facilitate dissolving and penetration of the trona bed. The liquefaction pressure required in underground mining can be reached because the massive trona ore body functions as the pressure enclosing medium. This liquefaction also provides a method for the deliberate collapse of large solution-mined cavities by removing the structural strength of undissolved, supporting, trona pillars. This would minimize the heat loss of the extracting liquor to the surrounding cavities and assure good contact with the solid trona formation.

The conversion of solid trona to an equilibrium mixture of Wegscheider's salt and sodium carbonate, with an attendant liquid phase, also is most advantageous. It permits dissolution of this mixture by an underground extraction liquor without reprecipitation and buildup of a surface barrier of $NaHCO_3$ on the dissolving face of the solid such as is ordinarily encountered when solution mining trona. Such surface barriers are most undesirable because they impede the rate of dissolution by the aqueous solvent. This $NaHCO_3$ re-precipitation occurs in trona extraction but does not occur in extracting Wegscheider's salt and sodium carbonate because a solid sodium bicarbonate phase per se cannot exist in a hot aqueous solvent system saturated with Wegscheider's salt and sodium carbonate.

Specific test data that illustrate trona liquefaction are shown in graphic form in the attached drawings.

In the drawings:

FIG. 2 represents a graphic illustration of the pressure exerted by the enclosed trona sample at progressively higher temperatures as measured by an Instron apparatus when tested as set forth in Example 3.

Figure 1:
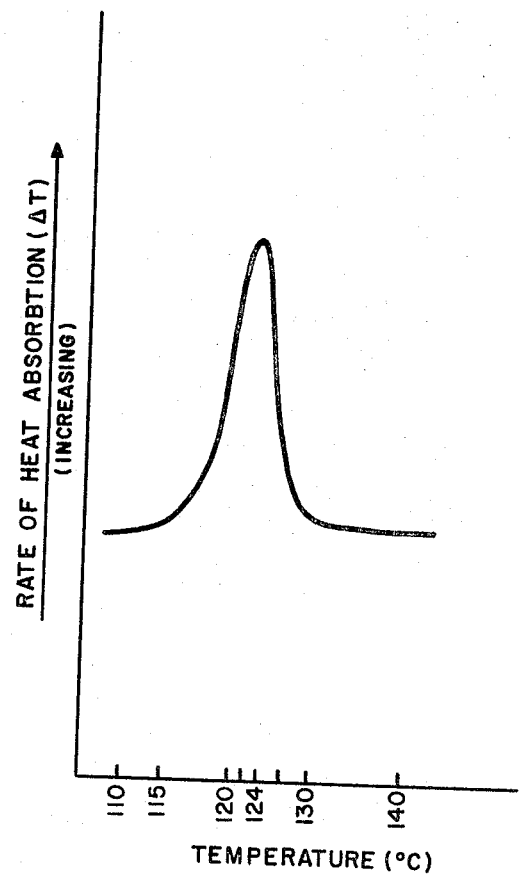
FIG. 1 is a graphic illustration of heat absorption by the sealed trona sample at various temperatures. The heat absorption was measured in a differential thermal analysis apparatus by the procedure set forth in Example 2.

In FIG. 1, the heat absorption of the trona is shown as proceeding in linear fashion until a temperature of about 119° is reached. Thereafter, a sudden increase in the rate of heat absorption is obtained. This is represented by the rate of change in the slope of the curve in FIG. 1, which reaches its peak at a temperature of about 122° C. Thereafter, the rate of heat absorption sharply drops and at a temperature of about 128°, commences to absorb heat at a substantially linear rate. This sudden increase in heat absorption is characteristic of a phase transformation in which a phase change takes place at a temperature of about 122° C.

In FIG. 2, the pressure exerted by a trona sample against a pin in contact with the trona in a closed system and at increasing temperatures is graphically illustrated. The top portions of the spikes in FIG. 2 were obtained by lowering the crosshead of an Instron unit, used to measure the pressure until the indicated pressure was exerted by the trona sample. Thereafter, the trona sample showed a relaxation, or decrease in pressure, when heated to progressively higher temperatures. Accordingly, it was necessary to lower the crosshead periodically, in order to maintain pressures which fall within the measurable range of the Instron. Thus, FIG. 2 illustrates a series of spikes followed by relaxation curves.

The point at which the pin commences to penetrate into the specimen because of a failure of the strength of the specimen is readily observable by the change in the normal relaxation pattern. Thus, in FIG. 2, once the temperature of 123° has been reached, the relaxation pattern changes sharply and, in place of the wide peaks followed by long relaxation curves which are obtained at temperatures below 121°, narrow peaks are obtained in which the relaxation curves are much faster and sharper, indicating penetration of the pin into the trona. This illustrates that when the trona is heated at from about 122° to about 123° in an enclosed space, under autogenous pressure, a sudden drop in the structural strength of the trona sample occurs.

The following examples are given to illustrate the present invention and are not deemed to be limiting thereof:

*Example 1*

A liquid phase in trona was formed and observed as follows:

Samples of trona mineral chips and of synthetic crystallized sodium sesquicarbonate were completely encapsulated in epoxy discs and the epoxy resin was cured overnight at room temperature. The discs containing the samples were evacuated prior to curing to remove any air voids around the samples. The discs were then placed on a microscope hot stage and heated under controlled conditions to progressively higher temperatures. The crystals were observed through the microscope by means of transmitted (white) light during the heating at 5 minute intervals, except that a surface spot was used to provide momentary surface illumination. The following was observed of the trona sample:

| Temperature (° C.): | Observation |
|---|---|
| 25 | Crystal transparent and clear. |
| Heater on: | |
| 110 | Slight darkening of crystal edges. |
| 111 | No change. By reflected light, thin surfaces (milky white) appear to start at crystal boundaries and fan out in all directions—it appears brown by transmitted light. |
| 112.8 | No change. |
| 115 | Dark (brown) areas moving in from crystal "ends." |
| 117.5 | Darkening spreads as a discontinuous, shallow layer—body of crystal remains transparent and clear. |
| 121 | General increase in darkened areas on surface of crystals. |
| 122 | No change. |
| 122.9 | Darkened areas in crystal become light (translucent)—remainder of crystal brilliantly transparent. |
| 125.9 | Most of surface covered with semi-translucent patches of liquid. |
| 128.1 | Entire crystal becomes translucent. |
| 130 | No change. |
| 131.5 | No change. |
| Heater off: | |
| 25 | Crystals were bone white—no longer translucent. |

This was repeated with the sodium sesquicarbonate crystals and the same results were obtained as with the trona samples. The above run was repeated on eight samples with the same results.

Example 2

The formation of a liquid phase was also determined by measuring the increase in heat absorption required to bring about a phase change.

A —100 sieve sample of ground, synthetic, crystallized sodium sesquicarbonate, weighing 219 mg. was placed in a Differential Thermal Analysis (DTA) Inconel liquid sample holder. A tight fitting fritted glass disc was placed over the sample and sealed to the holder by pouring an epoxy resin over the disc and curing the epoxy resin at room temperature overnight. The sealed sample was placed in a DTA (Differential Thermal Analysis) apparatus (Model 13M2—manufactured by Robert L. Stone Co., Austin, Tex.) and was heated at a nominal rate of 1° C./min. The graphic results illustrated in FIG. 1 show a heat absorption peak at 122 to 123° C.; the heat absorption returns to normal at about 130° C.

Example 3

This example was carried out to show the change in structural strength of the trona (as penetration of a pin into the sample) when liquefaction occurs. The Instron, Model Type TT–B (manufactured by Instron Engineering Co., Quincy, Mass.) which is a tensile testing instrument, was used to measure the pressure exerted by the trona sample against the crosshead of the instrument.

In this example, a solid cylindrical sample of trona mineral was placed in a cell made up of a steel tubular body and having a piston which presses a pin in contact with the trona sample. The cell was sealed off from the atmosphere, placed in the jaws of the Instron, the crosshead lowered until it contacted the piston and a pressure response was obtained on a recording chart. The entire cell and the jaws of the Instron were then placed in an air bath and the temperature was raised gradually to progressively higher temperatures. During heating, it was found that the pressure did not build up while heating; instead, a relaxation phenomenon was observed from the initially set pressure on the piston. It was therefore necessary to periodically lower the crosshead onto the piston to keep pressure on the piston within the response values of the instrument. This is illustrated in FIG. 2 as a series of spikes, the peak pressures being applied by lowering the crosshead on the piston, followed by a series of relaxation curves as the trona sample was progressively heated. The end point, or temperature where the pin begins penetrating the specimen, is readily observable by the change in the normal relaxation pattern. This is shown in FIG. 2 as taking place at about 122–123° C. in which the "wide" peaks or relaxation curves are followed by "narrow" peaks or relaxation curves. Upon opening the cell, the pin was found to have penetrated into the top of the cylindrical trona sample.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims the invention may be practiced by those skilled in the art, and having the benefit of this disclosure, otherwise than as specifically described and exemplified herein.

What is claimed is:

1. A process for dissolution of solid sodium sesquicarbonate dihydrate comprising heating said sodium sesquicarbonate to a temperature of at least about 122° C. under water vapor pressures of at least about 1200 mm. of mercury, said solid sodium sesquicarbonate converting in part to a liquid phase distributed throughout its structure, said liquid phase comprising a saturated aqueous solution of sodium bicarbonate and sodium carbonate, and contacting the resulting mixture of said liquid phase and residual solid phase with hot aqueous solvent to form a solution of desired concentration.

2. Process of claim 1 wherein said water vapor pressures necessary for liquefaction are autogeneously produced by heating said solid sodium sesquicarbonate.

3. Process of claim 1 wherein said liquefaction occurs at external pressures of from about 22 to about 700 p.s.i.

References Cited

UNITED STATES PATENTS

| | | | |
|---|---|---|---|
| 3,028,215 | 4/1962 | Frint | 23—63 |
| 3,246,962 | 4/1966 | Miller | 23—64 X |
| 3,273,958 | 9/1966 | Peverley | 23—63 |

OTHER REFERENCES

Waldeck et al., Journal of Amer. Chem. Soc., 54, pages 928 to 930, 1932.

NORMAN YUDKOFF, *Primary Examiner.*

S. EMERY, *Assistant Examiner.*